May 17, 1966 L. J. LENS 3,251,397
MULTIPLE EFFECT EVAPORATOR OF THE SINGLE HORIZONTAL
BODY, NESTED SHELL TYPE
Filed Dec. 17, 1962 7 Sheets-Sheet 1

Inventor:

Inventor:

Inventor:

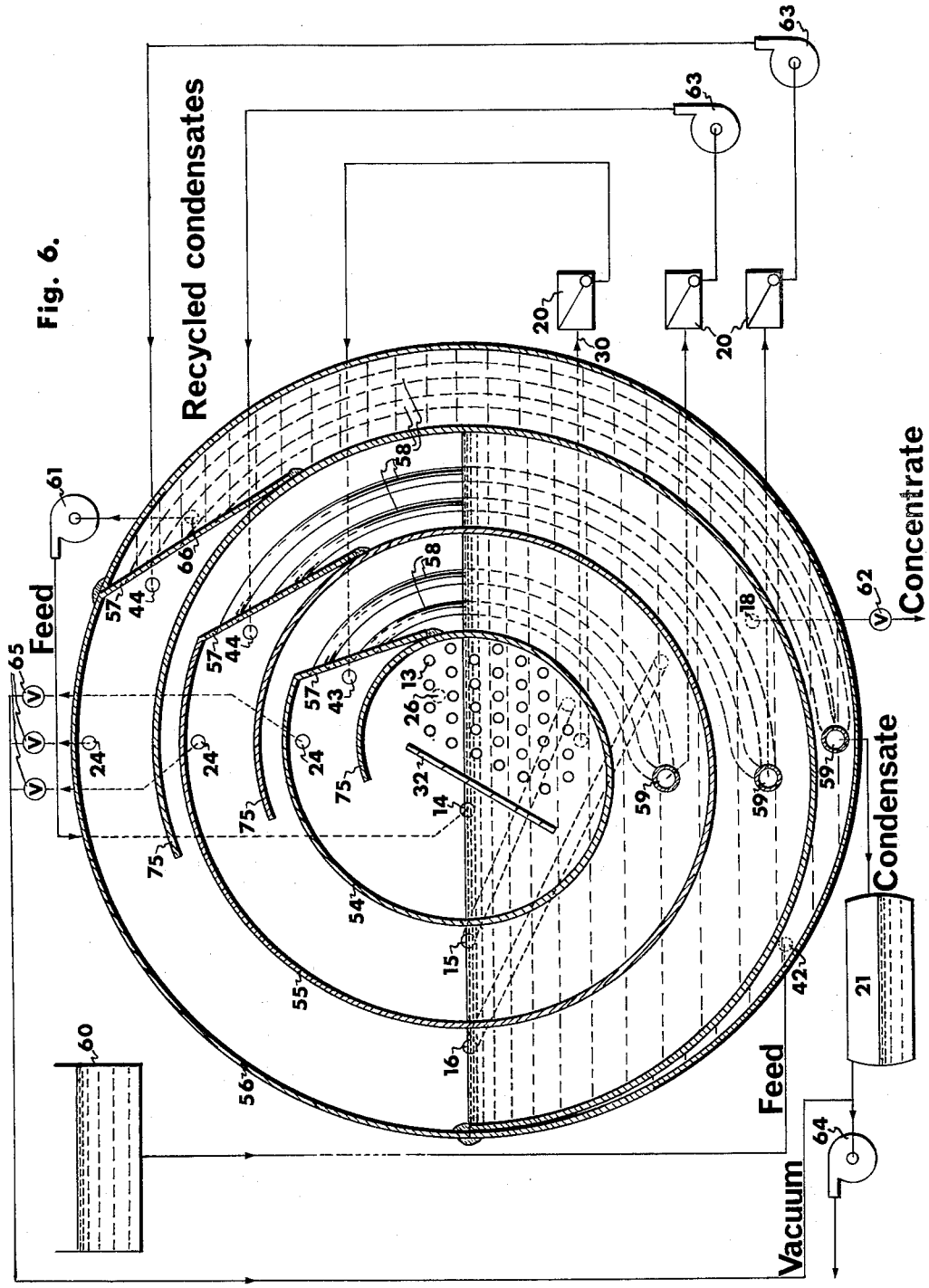

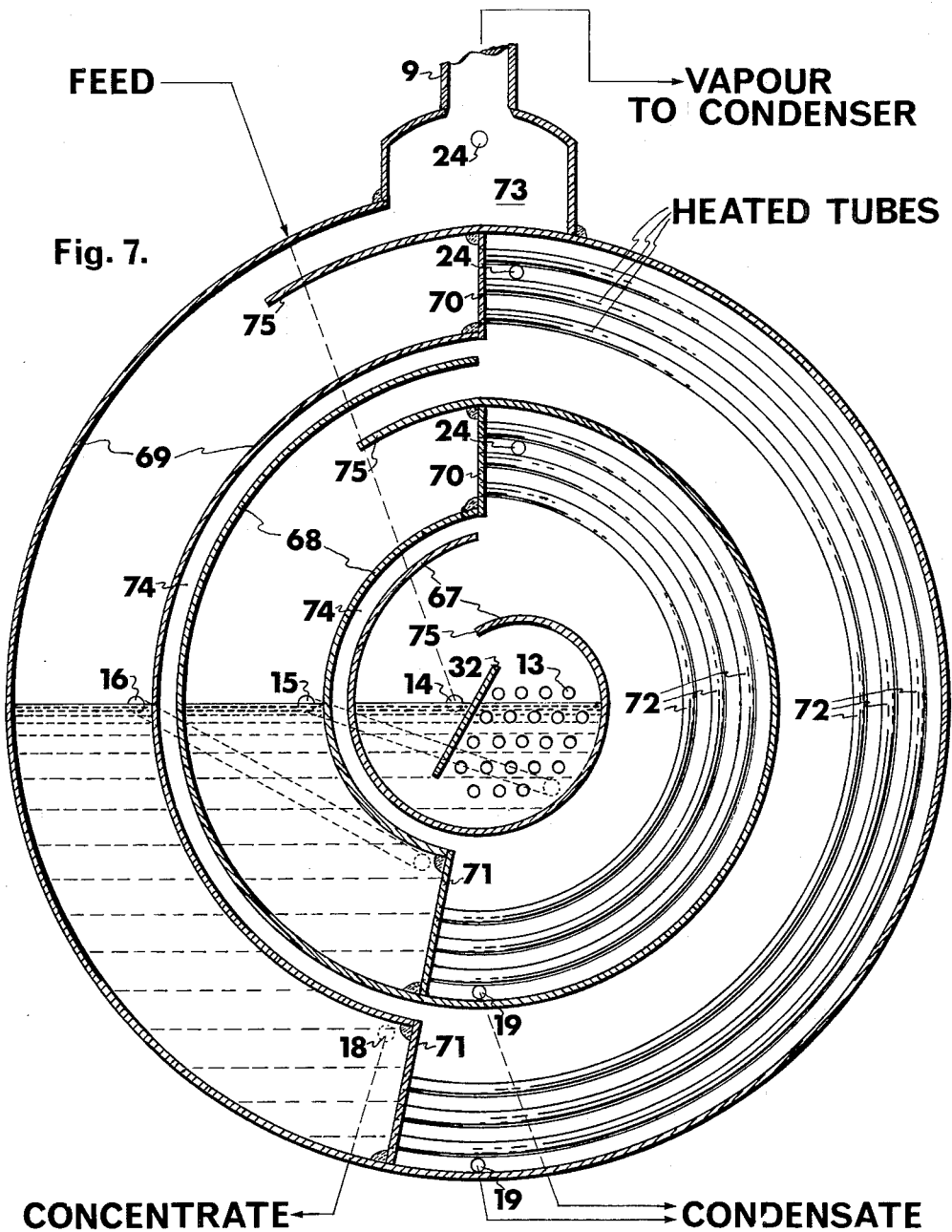

United States Patent Office 3,251,397
Patented May 17, 1966

3,251,397
MULTIPLE EFFECT EVAPORATOR OF THE SINGLE HORIZONTAL BODY, NESTED SHELL TYPE
Leonard Joseph Lens, 403 Golden Acres, Fife Ave. and Joel Road, Johannesburg, Republic of South Africa
Filed Dec. 17, 1962, Ser. No. 245,084
5 Claims. (Cl. 159—17)

This invention relates to improvements in the design of multiple effect evaporators.

This type of evaporators is widely used in many industries for the concentration of various products, with a view to the recovery of non-volatile material in a concentrate, volatile material in a condensate, or both.

In this process, the liquid to be concentrated is circulated successively through several vessels, boiling and evaporation taking place in each of these. Heat is supplied to the first vessel only. The vapour evolving from the boiling liquid contains the largest part of the heat supplied originally. This vapour is used for the heating of the second vessel, by feeding it through a bundle of tubes or similar equipment submerged in the liquid in the second vessel. In this way, boiling and evaporation is performed also in the second vessel, and the same process are repeated, using the vapour from the second vessel as heating means for the third vessel, etc.

The interest of the process resides in the fact that the vaporization heat contained in the vapour is recovered at each stage and re-used to obtain more vaporization. This vapour condenses in each heating element and condensate is recovered from each effect.

In some instances, vacuum may be applied to the last effect, lowering the boiling points and allowing the use of a larger number of effects. This is also of interest when treating substances which might be deteriorated by excessive temperatures.

The more effects are used, the better should be theoretically the heat utilization and the performance of the equipment. However, one is rapidly stopped when trying to increase the number of effects, and in practice, seven effects are probably a maximum for installations of large capacity, and four effects for evaporators of medium size.

There are several reasons for this limitation. Each vessel must be generally of a larger size than the preceding one, due to the fact that it operates at a lower pressure. The different sections are connected together by several piping circuits, for concentrate, condensate, vapour and auxiliary services. Several pumps, valves and level controls have to be installed to insure the proper flow of the liquids. Each vessel must be carefully protected by a thermal insulation, as well as the vapour connections which are of large diameter, and most of the other piping work. Even in the best design, a very important surface of apparatus of intricate shape must be protected in this way, otherwise the advantage of heat re-use would be lost by radiation. No heat insulation is however perfect, and some heat losses must always be expected, which are approximately in proportion to the exposed surface of the apparatus. A point is thus rapidly reached where the cost, complication and bulkiness of one additional effect is not justified by the savings obtained.

The aim of the present invention is to provide a new type of design for multiple effect evaporators, permitting a more complete and easier heat recovery, a simpler and cheaper construction, a larger number of effects when required and thus a better general performance than the conventional multiple effect evaporators. These results are obtained by disposing the different vessels of the evaporator in such a manner that each effect is enclosed in the following one. The term "evaporative liquid body" is used hereafter and means a mass of the liquid being heated in the evaporator and taking by boiling the active part in the evaporative process. This term does not refer to such arrangements known in the art as "films," or relatively thin layers of liquid adhering or flowing along a solid partition for the purpose of heat transfer resulting in evaporation or condensation. The term "evaporative liquid body" wherever it appears in the foregoing specification and claims, is to be understood as limited by the above definition. The term "preheated liquid body" is used hereafter and means a mass of the liquid to be treated in the evaporator which is brought in indirect heat exchange relation with a part of the evaporator before being submitted to evaporation, in order to preheat this liquid and to recover a certain amount of heat that would otherwise be lost, or in order to condense by indirect heat transfer vapours evolving from the evaporator, or for both purposes. The term "preheated liquid body" wherever it appears in the foregoing specification and claims, is to be understood as limited by the above definition.

FIG. 6 is a section through a three effects evaporator with induced circulation, vapour tubes bundles, re-use of flash vapour and final condenser included. This figure shows also the principal parts of ancillary equipment.

FIG. 7 is a section through a three effects evaporator with induced circulation of the liquids in the tubes.

Figure 1:
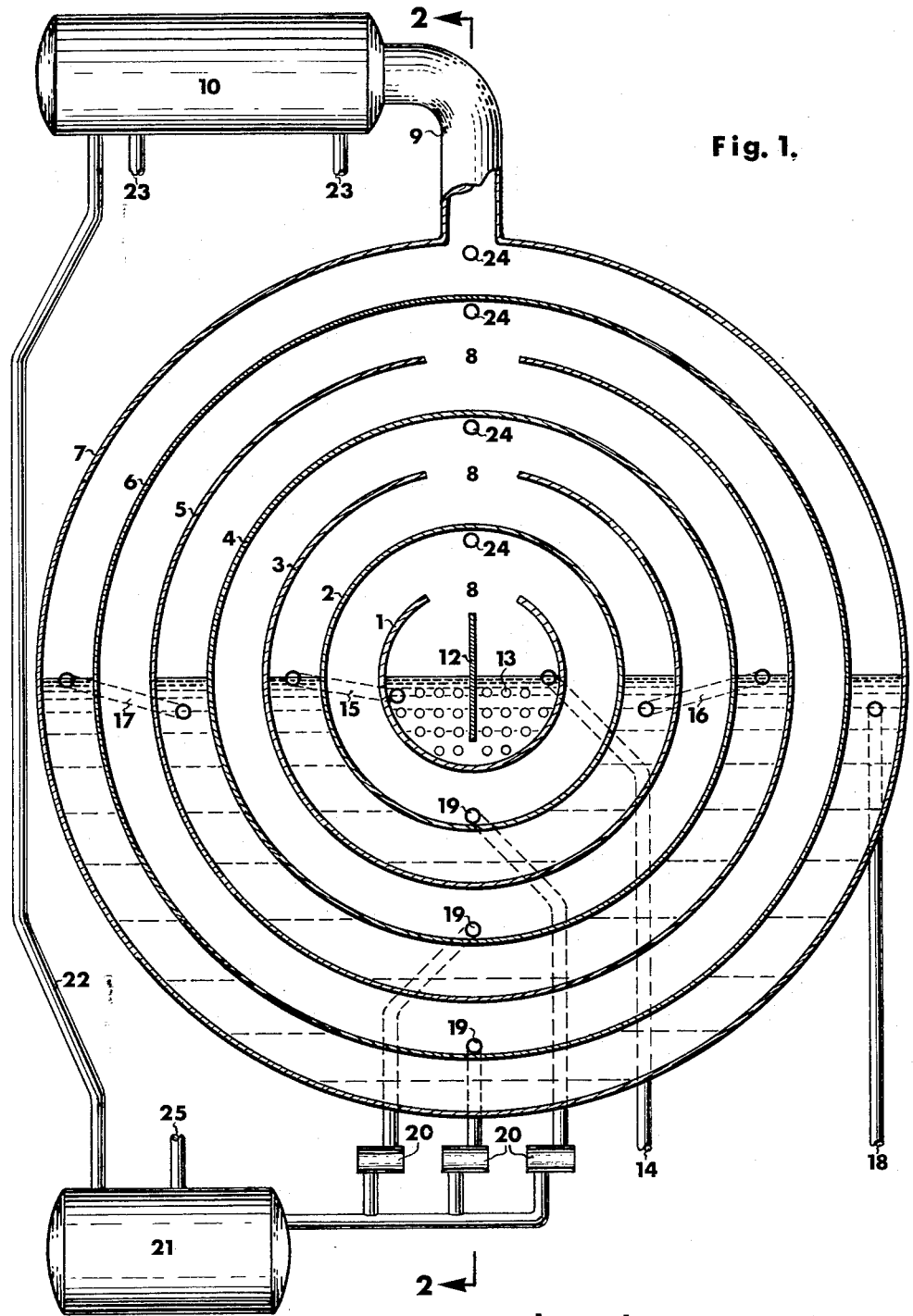
FIG. 1 is a transversal section through a four effect evaporator according to the invention, and shows also some ancillary equipment.
Figure 2:
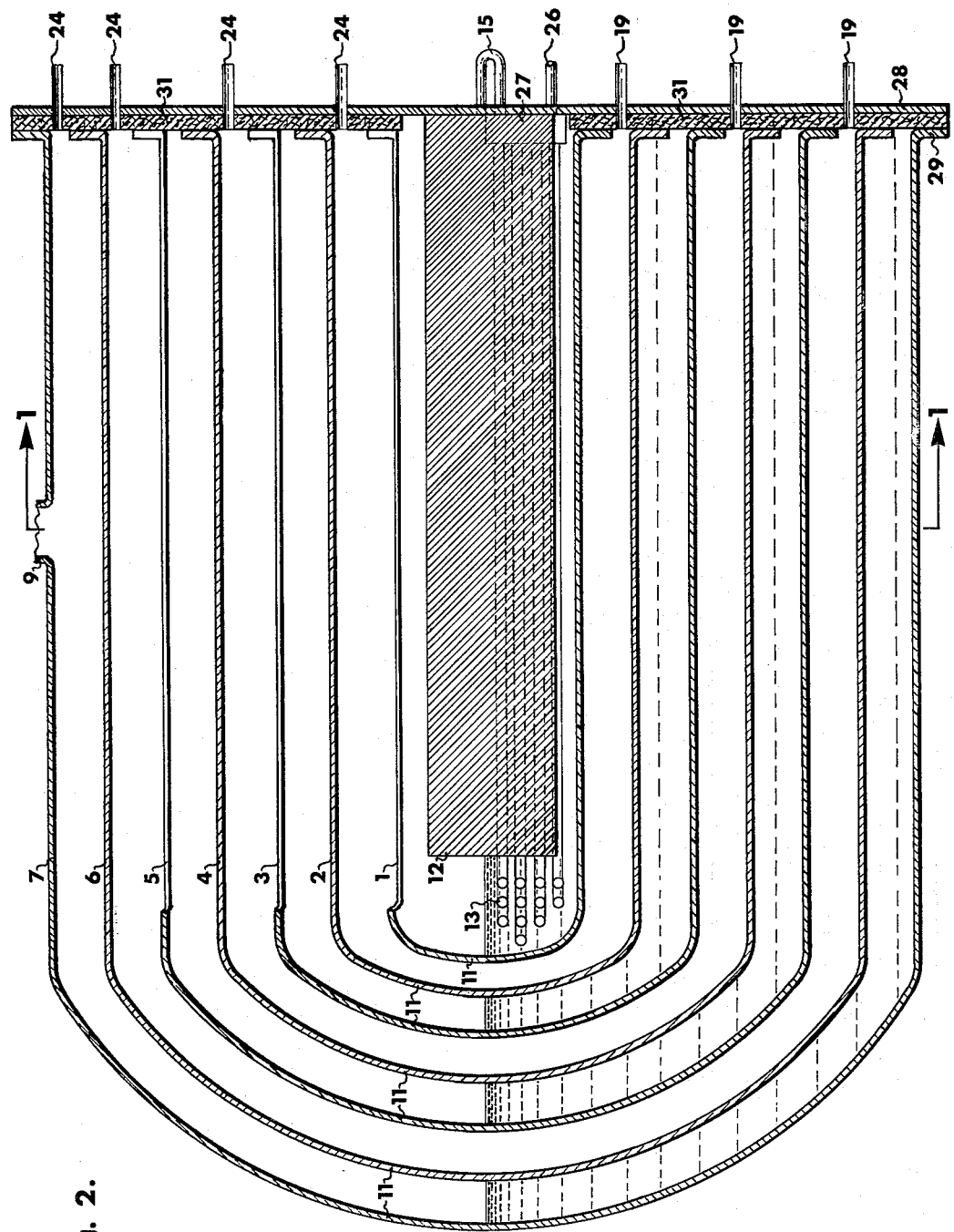
FIG. 2 is a longitudinal section through the same evaporator.
Figure 3:
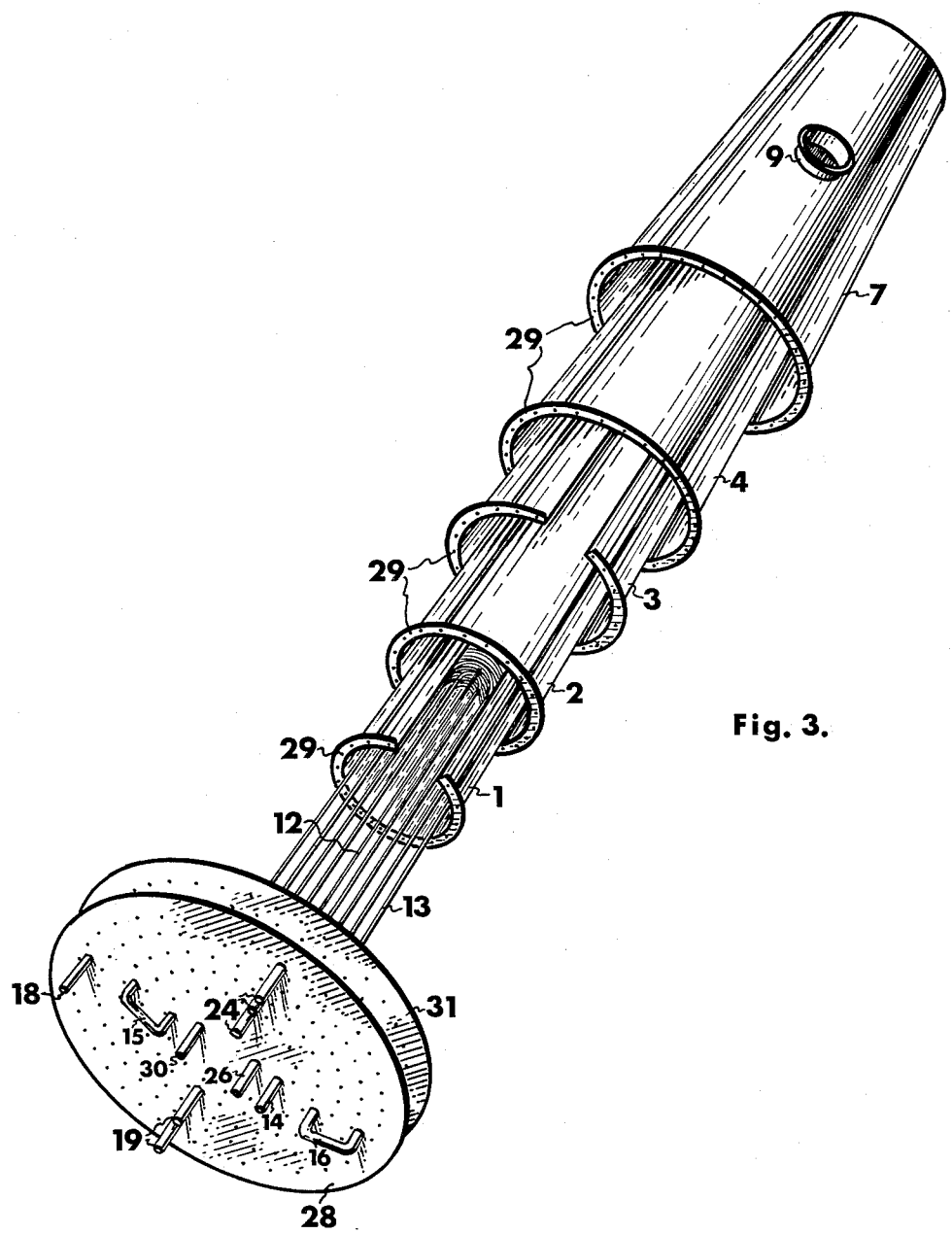
FIG. 3 is an exploded view of the constituent parts of a three effects evaporator.

Referring to FIGS. 1, 2 and 3, the multiple effect evaporator comprises seven concentric cylindrical shells 1, 2, 3, 4, 5, 6 and 7 (or five concentric cylindrical shells 1, 2, 3, 4 and 7 for the three effects evaporator in FIG. 3). Referring to FIG. 2, each of these shells is terminated at one end by a dished part 11. The other ends of the shells are fitted with rims 29 and secured to the front plate 28 by means of bolts (not shown) traversing the front plate 28 and the rims 29. A gasket 31, positioned between the front plate 28 and the rims 29 ensures the required tightness between the different sections. In large units, the shells may be supported by additional supporting members placed at any convenient position. (Not shown on the drawings.) The shells 1, 3 and 5 in FIGS. 1 and 2 (or 1 and 3 in FIG. 3) have each an opening 8 extending along one generant of the cylinder from the dished end 11 to the rim 29.

Referring to FIGS. 1 and 2, a vertical baffle 12 separates partially the compartment defined by shell 1. A bundle of steam heating tubes 13, connected to the steam distribution box 27 are disposed in the compartment defined by shell 1 on both sides of the baffle 12. Steam is applied to the steam feed pipe 26, and steam condensate removed through the steam condensate outlet 30.

The apparatus is positioned with the axis of the cylindrical shells horizontal, and the openings 8 towards the top.

Referring to FIG. 1 the liquid to concentrate is fed through pipe 14 into the compartment defined by shell 1. It flows from there through pipe 15 into the space between shells 2 and 3, then through pipe 16 between shells 4 and 5, and through pipe 17 between shells 6 and 7. The concentrated liquid is finally drawn off through pipe 18.

The external compartment comprised between shells 6 and 7 is connected through pipe 9 to a condenser 10, cooled by a cooling fluid circulating through the pipes 23.

This condenser is connected to the condensate receiving tank 21 by means of pipe 22.

Vacuum may be applied to the system through pipe 25, or this pipe may be left open to the atmosphere if vacuum operation is not required. Openings 24 are closed by valves in operation, but may be opened to the atmosphere or to a vacuum circuit when starting the apparatus, in order to evacuate the air contained in each section. (As shown in FIG. 6 in the case of vacuum operation.)

Condensates from each effect are removed through pipes 19 and vapour traps 20, and flow from there into the condensate receiving tank 21. The vapour traps allow the passage of liquid, but automatically shut when vapour is present, removing thus only condensed liquid and no vapour from the evaporator. They may be of any conventional design used in evaporators.

All the pipes, except the vapour outlet 9, are connected through the front plate 28 (FIG. 2). However, it would be equally possible to design the evaporator with pipe 9 on the front plate 28 (FIG. 2).

The operation is not different from that of conventional multiple effect evaporators. The vapour evolving from each liquid containing section is distributed in the empty space surrounding said section and heat transfer occurs through the shells 2, 4 and 6 between this vapour and the liquid contained in the next section. Boiling of each evaporating liquid body is obtained in this way as well as condensation of the vapour in the empty spaces. These condensates flow to the bottom of the empty sections and are removed continuously through pipes 19 by means of the vapour traps 20.

Condensation of the vapour together with boiling of the liquid in the following section is possible due to the difference of pressure, and consequently of boiling point which is automatically obtained between the successive effects. This phenomenon is common knowledge in multiple effect technics.

If necessary, the level in each effect may be maintained by any conventional system of automatic level control, and must not necessarily be the same in all the effects. In fact, if no level control is employed, it is found that in operation, the evaporator reaches a state of equilibrium in which the levels of liquid are different in each effect, due to the differences of pressure between the effects. However this state of equilibrium depends on different factors: rate of evaporation, concentration of the liquid, etc., and if the evaporator is intended for operation under variable conditions, it will be generally preferable to stabilize the operation by artificially maintaining the desired level in each effect by automatic control. Heating of the first effect may be performed also by electrical heaters or other means instead of steam.

The evaporator as shown in its simplest form in FIGS. 1, 2 and 3 would be sufficient for simple cases of evaporation, with liquids not too viscous and not foaming.

Figure 4:
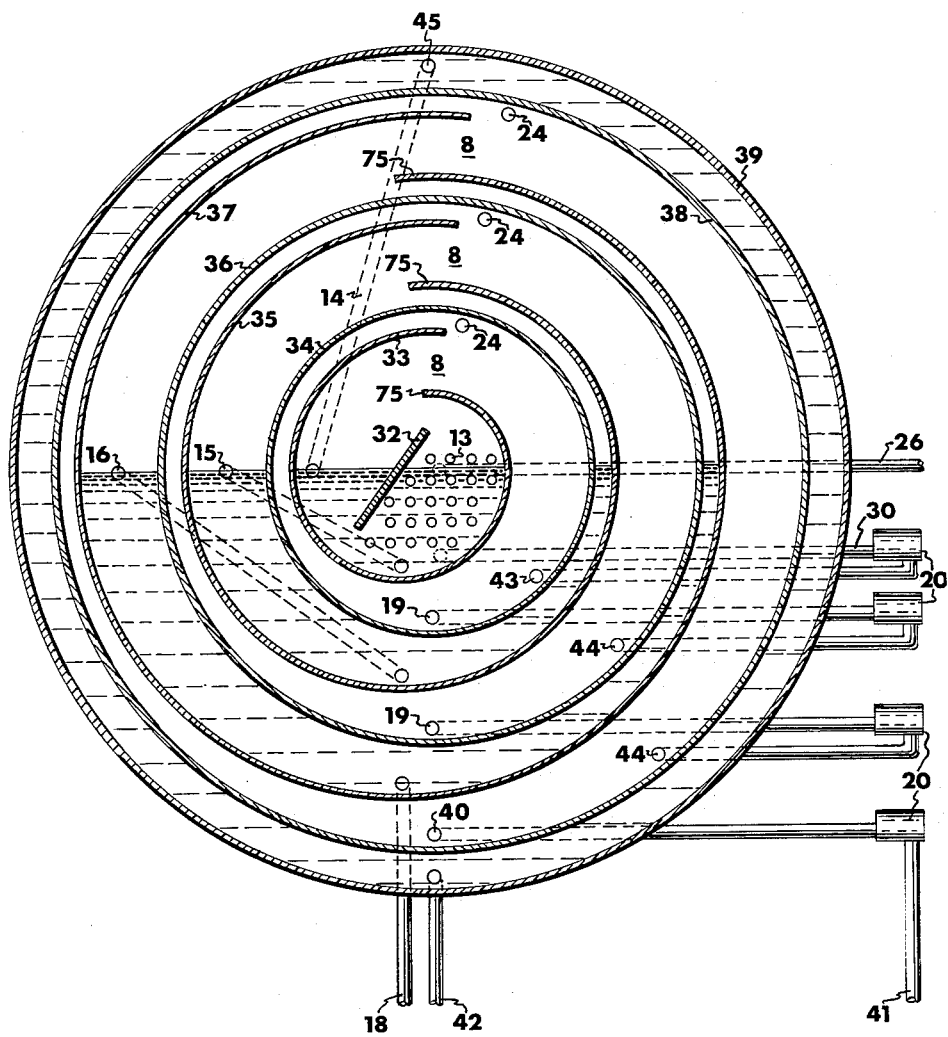
FIGS. 4 and 5 are transversal sections through a three effects evaporator with induced circulation of the liquids, re-use of flash vapour and final condenser included.
Figure 5:
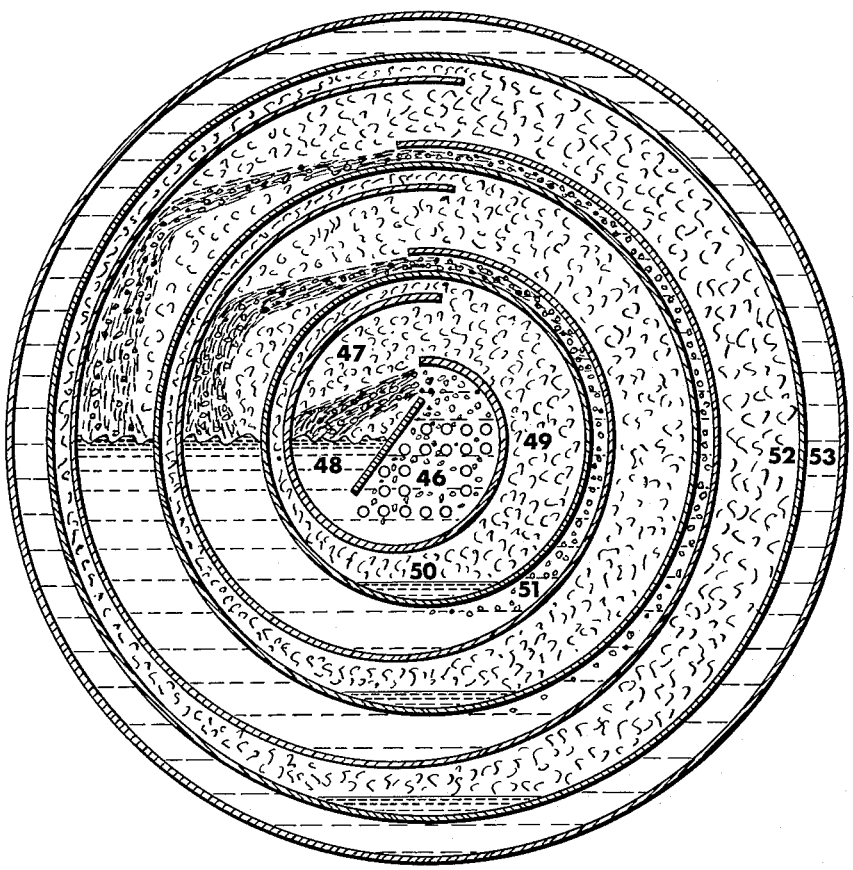

A more elaborate embodiment is presented in FIGS. 4 and 5. This three-effects evaporator is composed of seven shells 33, 34, 35, 36, 37, 38 and 39 disposed eccentrically as shown in FIG. 4. Boiling occurs principally in the right section of each compartment, where a relatively thin layer of liquid is opposed to a large quantity of vapour. In the left side, on the contrary, a large quantity of liquid is opposed to a small quantity of vapour.

Referring to FIG. 4, the first effect is heated by means of steam supplied to a steam tubes bundle 13 through the pipe 26, and is partially separated in two sections by an inclined baffle 32. But in this case, the heating element is completely situated at one side of the baffle 32. The steam condensate obtained in pipe 30 is returned in 43 to the next vapour compartment through one of the vapour traps 20. In the same way, the condensate from each vapour compartment is removed in 19 and returned to the next vapour compartment in 44 through vapour traps 20. The total condensate is removed in 40 from the last vapour compartment, and recovered in 41 through the last vapour trap 20. The liquid to be treated is fed to the apparatus in 42, fills up completely the space between shells 38 and 39, and flows through opening 45 and pipe 14 to the first effect. From there, it is circulated successively through all the effects through pipes 15 and 16, and removed after concentration through pipe 18.

When steam is applied to the steam tubes 13, boiling takes place in 46 (FIG. 5) and a mixture of vapour and liquid is hurled into the left compartment 48 by the deflection plate 75, made as an extension of shell 33. Vapour separates in 47 from this mixture and is distributed in 49, where it supplies heat to the liquid contained in the next effect, boiling takes place in the latter from the point 51. The same cycle is repeated in each effect. The condensate flows to the bottom of each compartment in 50.

It must be emphasized that in this design, no external condenser is employed. The vapour from the last effect is condensed by the preheated liquid body circulating in the external compartment as in 52 and 53 of FIG. 5, and the heat contained in this vapour is automatically recovered by pre-heating the feed liquid.

A continuous circulation of the liquid in each effect is induced by means of this asymmetrical heating, allowing the treatment of foaming or viscuous products.

The condensate from each effect is returned to the vapour compartment of each following effect, and coming at this time in presence of a lower pressure, it gives off some flash vapour and is cooled further. Some heat is thus recovered in that way and re-used in the evaporator. The steam condensate is also re-used in the same manner, but this can be done only when evaporating an aqueous solution, or when the mixing of water with the solvent is permitted. Vacuum operation is possible by connecting openings 24 and the condensate receiver to a vacuum source, in the same manner as illustrated in FIG. 1 and FIG. 6. This more complex example is given here to illustrate the possibilities of the invention. It would be equally possible to operate this latter type of evaporator without preheating the feed and re-cycling the condensates. In this case the shell 39 should be deleted, the raw product fed directly in 14, the last vapour compartment connected to an external condenser and the different condensates collected through steam traps, as shown in FIG. 1.

When a larger heat exchange area is necessary, the apparatus can be designed as shown in FIG. 6. This three-effects evaporator comprises three main parts 54, 55 and 56, which may be assembled on a front plate as in the previous embodiments. Each compartment is terminated by a plate 57. A bundle of tubes 58 is connected between this plate and a collecting pipe 59.

The feed liquid, stored in a head tank 60, is fed through pipe 42 to the external compartment, acting here again as final condenser and feed pre-heater, and from there is conveyed through pipe 66, feed pump 61 and pipe 14 into the first effect.

Steam condensate is removed from the steam heater through pipe 30 and the first vapour trap 20, and returned in 43 where it is mixed with the vapour from the first effect. Condensate from each effect is returned to the following heating tubes through vapour traps 20 and condensate recycle pumps 63. Due to the position of the openings 43 and 44, it can be seen from the drawing that the recycled condensates cannot flow back into the solution, but only into the tubes 58. The vapour flow entering the tubes 58 near this point assists in carrying into the tubes any splashing that might occur at this point. Part of this condensate flashes at each stage and provides more utilizable heat. The remainder of the condensate is progressively cooled down by passing from stage to stage through the different tubes bundles at decreasing temperatures. By this means the final condensate is withdrawn at the lowest possible temperature, its heat content being recovered in the different stages of the apparatus. The final condensate is removed in the last condensate collecting pipe 59 and stored in the condensate tank 21. Vacuum is applied if required to the system by means of the vacuum pump 64, connected to the condensate receiving tank. Some suction may be applied also when required to each effect separately through vent pipes 24 and vent valves 65, in order to evacuate non-condensable gases from the apparatus. The concentrated liquid is removed through pipe 18 and valve 62, this line being connected to a concentrate extraction pump or other suitable equipment (not shown on the drawing.)

In this latter type of design, the successve evaporative liquid bodies are separated by a single metal partition. An appreciable amount of heat transfer is thus likely to occur directly through the shells between the liquids, and a smaller difference of pressure will result between the effects. This difference of pressure would be insufficient for the recycling of the condensates to a higher level in each effect, and this is the reason for the condensate recycle pumps 63.

The feed pump 61 is placed between the final condenser-preheater and the first effect. In this way, the relatively high pressure required for feeding the first effect is not applied to the external shell, which may be of lighter construction.

FIG. 7 shows another embodiment in which the liquid is circulated through the tubes in each bundle. The evaporator comprises three main parts 67, 68 and 69. The tubes 72 are connected between the plates 70 and 71, and the mixture of vapour and liquid ejected by boiling from the tubes is hurled into the left compartment by means of the deflection plates 75. Vapour separates and is distributed to the space surrounding each next tubes-bundle. The vapour from the last effect is conveyed to an external condenser (not shown) through the vapour disengagement space 73 and pipe 9. An empty space 74 is provided between the different effects, reducing the direct heat transfer between the liquids (the same feature exists in FIG. 4), and giving rise to higher differential pressures.

The various embodiments presented are intended to show the principles of this new type of design and its high versatility. Other modifications of the construction may be considered. Instead of being terminated with dished ends, the various shells may be secured between two plates by means of rims and bolts, or if dished ends are used, they may be made as separate parts bolted to the shells. This disposition presents some advantages if the unit has to be frequently opened for cleaning or descaling. Sight windows may be installed through the front plate for visual observation of the operation. The concentrate may be cooled before leaving the evaporator by passing it through tubes or similar equipment submerged in the feed liquid in the external heat exchange compartment.

A complete design is dependent of a specific problem of evaporation, but can be achieved in any case in the lines of the present invention by using the methods of calculation normally employed for the design of evaporators.

Numerous advantages arise from this new type of design. The successive effects being nested one in another, the heat losses from each section are automatically recovered in the next one. Only the most external shell has to be protected by thermal insulation, but here this insulation will have the highest possible efficiency, the last effect operating at the lowest temperature. This thermal insulation will have to be installed on one single vessel of regular shape, instead of the numerous vessels and pipes of intricate pattern which have to be insulated in common equipment. In designs incorporating a condenser-preheater, as in FIGS. 4, 5 and 6, this external insulation will even be unnecessary in most cases.

The cost of an evaporator according to this invention would be lowered by the absence of heat insulation, but also by the very simple construction. The evaporator may be constructed as one single self-contained unit. No extended and complicated supporting frames are required External pipes are reduced to a minimum, for most of the ancillary equipment such as valves, vapour traps, level controls, liquid connections between effects, pumps, can be conveniently installed in close proximity of the front plate, requiring only very short lengths of pipe. Vapour connection pipes, which are of large diameter in conventional equipment are here completely suppressed.

It must be pointed out also that the pressure increasing in the different sections from the outside to the inside, each shell has to be designed only for the differential pressure existing between two successive compartments. The whole construction may thus be lighter, giving again a lower cost and at the same time a better heat transfer by the utilization of thinner materials.

Each effect may be constructed as one single complete unit, rendering the replacement by a spare unit very easy when repair works become necessary.

If the recycling of the condensates and the included condenser are adopted, the condensate is recovered at a low temperature. The significance of this is that the maximum quantity of heat has been used for actual evaporation.

Maintenance works and operation of this type of evaporator are also easier, due to the simplicity of the equipment.

Having thus described my invention, what I claim as new and desire to secure by Letters Patent is:

1. A multiple effect evaporator in which a series of evaporative liquid bodies of a liquid to be concentrated by evaporation are nested one in another, each of said evaporative liquid bodies being contained between horizontal solid shells also nested one in another, each of said evaporative liquid bodies filling partially a chamber defined by said shells, said multiple effect evaporator having means for applying indirect heat to the innermost of said evaporative liquid bodies, said multiple effect evaporator having means for bringing the vapour evolving from each of said evaporative liquid bodies except the outermost in indirect heat exchange relation with each next outwardly evaporative liquid body, said multiple effect evaporator having means for condensing the vapour evolving from the outermost of said evaporative liquid bodies, said multiple effect evaporator having means for withdrawing the condensate resulting from the condensation of the vapour evolving from each of said evaporative liquid bodies, said multiple effect evaporator having means for introducing a feed-liquid to be concentrated by evaporation into the innermost of said evaporative liquid bodies, said evaporative liquid bodies being serially connected by means of pipes so as to obtain a flow of liquid from each of said evaporative liquid bodies except the outermost to each next one outwardly, said multiple effect evaporator having means for withdrawing a concentrated product from the outermost of said evaporative liquid bodies, said multiple effect evaporator having means for evacuating non-condensable gases contained therein.

2. A multiple effect evaporator as defined in claim 1, in which indirect heat is supplied to the innermost evaporative liquid body by means of steam circulated through tubes, said tubes being immersed in said innermost evaporative liquid body, the water resulting from the condensation of said steam being introduced into the vapour evolving from said innermost evaporative liquid body.

3. A multiple effect evaporator as defined in claim 1, having means for mixing the condensate resulting from the condensation of the vapor evolving from each evaporative liquid body except the outermost with the vapor evolving from each next outwardly evaporative liquid body, the condensates resulting from the condensation of the vapors evolved by all the evaporative liquid bodies being recovered by this means as a single total condensate, and in which indirect heat is supplied to the innermost evaporative liquid body by means of steam circulated through tubes, said tubes being immersed in said innermost evaporative liquid body, the water resulting from the condensation of said steam being introduced into the vapour evolving from said innermost evaporative liquid body.

4. In combination, a multiple effect evaporator as defined in claim 1, said multiple effect evaporator being contained in a larger vessel, said combination having means for circulating the preheated liquid body to be concentrated by evaporation in the space comprised between the outermost shell of said multiple effect evaporator and the walls of said larger vessel prior to introducing said preheated liquid body to be concentrated by evaporation into said multiple effect evaporator.

5. A multiple effect evaporator as defined in claim 1, in which each evaporative liquid body except the innermost is partially contained in tubes, said tubes having their outside walls in contact with the vapour evolving from each next inwardly evaporative liquid body.

References Cited by the Examiner

UNITED STATES PATENTS

| | | | |
|---|---|---|---|
| 153,764 | 8/1874 | Frykberg | 165—155 |
| 945,640 | 1/1910 | Thelan et al. | |
| 1,548,603 | 8/1925 | Ray et al. | 159—18 |
| 1,942,858 | 1/1934 | Hickman. | |
| 2,159,303 | 5/1939 | Waterman et al. | 159—13 X |
| 2,449,587 | 9/1948 | Chambers | 159—27 |
| 2,473,641 | 6/1949 | Feldstein | 159—28 X |
| 2,699,322 | 1/1955 | Feldstein | 159—28 X |
| 3,004,590 | 10/1961 | Rosenblad | 159—13 |

FOREIGN PATENTS

| | | |
|---|---|---|
| 18,130 | 1905 | Great Britain. |
| 56,668 | 9/1933 | Norway. |

NORMAN YUDKOFF, *Primary Examiner.*